(12) United States Patent
Jiang et al.

(10) Patent No.: US 9,594,616 B2
(45) Date of Patent: Mar. 14, 2017

(54) METHOD FOR IMPLEMENTING COUNTING CONTROL OF COUNTER, AND NETWORK CHIP

(71) Applicant: ZTE Corporation, Shenzhen (CN)

(72) Inventors: Haiming Jiang, Shenzhen (CN); Jiancheng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/781,835

(22) PCT Filed: Mar. 25, 2014

(86) PCT No.: PCT/CN2014/074010
§ 371 (c)(1),
(2) Date: Oct. 1, 2015

(87) PCT Pub. No.: WO2014/161439
PCT Pub. Date: Oct. 9, 2014

(65) Prior Publication Data
US 2016/0062809 A1  Mar. 3, 2016

(30) Foreign Application Priority Data

Apr. 2, 2013 (CN) .......................... 2013 1 0113681

(51) Int. Cl.
*G06F 11/00* (2006.01)
*G06F 11/07* (2006.01)
(Continued)

(52) U.S. Cl.
CPC ........ *G06F 11/076* (2013.01); *G06F 11/0721* (2013.01); *H04L 12/08* (2013.01);
(Continued)

(58) Field of Classification Search
USPC ............................................ 714/55
See application file for complete search history.

(56) References Cited

U.S. PATENT DOCUMENTS

| | | | |
|---|---|---|---|
| 6,931,572 B1* | 8/2005 | Schubert | G01R 31/31704 714/30 |
| 2011/0184575 A1* | 7/2011 | Kawamoto | G06Q 50/06 700/292 |
| 2013/0318400 A1* | 11/2013 | Liang | G06F 11/006 714/32 |

FOREIGN PATENT DOCUMENTS

| | | |
|---|---|---|
| CN | 1148921 A | 4/1997 |
| CN | 101771606 A | 7/2010 |
| CN | 103259668 A | 8/2013 |

OTHER PUBLICATIONS

International Search Report for corresponding application PCT/CN2014/074010 filed Mar. 25, 2014; Mail date Jul. 1, 2014.

* cited by examiner

*Primary Examiner* — Sarai Butler
(74) *Attorney, Agent, or Firm* — Cantor Colburn LLP

(57) ABSTRACT

Provided are a method for implementing counting control of a counter in a network chip, and a network chip. The method includes: periodically generating a counting value scanning message; reading a counting value of a corresponding counter item according to the generated counting value scanning message; analyzing and judging whether the read counting value is less than a preset overflow threshold; and informing the processor to handle counting abnormality of the counter when the read counting value is not less than the preset overflow threshold. The system can realize the periodic diagnosis on the counting state of the counter in the network chip by using a packet generator and a message processing engine, so as to prevent the processor from constantly (Continued)

sampling the counter to check the state of the counter, and ensure the calculation performance of the processor.

20 Claims, 3 Drawing Sheets

(51) Int. Cl.
    *H04L 12/08*           (2006.01)
    *H04L 12/70*           (2013.01)
    *H04L 12/26*           (2006.01)
(52) U.S. Cl.
    CPC .............. *H04L 43/02* (2013.01); *H04L 43/08* (2013.01); *H04L 43/16* (2013.01); *H04L 47/00* (2013.01)

METHOD FOR IMPLEMENTING COUNTING CONTROL OF COUNTER, AND NETWORK CHIP

TECHNICAL FIELD

The present disclosure relates to a network chip control technology, specifically to a method for implementing counting control of a counter, and a network chip.

BACKGROUND

At present, the development speed of networks is amazing. Due to growing of network flow and constant emerging of new services, network equipment needs to have quick and flexible processing capacities, which raises higher requirements on the performance of a core of the network equipment, i.e. a network chip (such as, a Network Processor (NP)). Generally, a great variety of counters, which are configured to implement port statistics, flow statistics and the like, are set in the network chip. Each item of a counter defines a certain amount of BITs, the width of which determines a maximum value of the counter, for example, the maximum value of the counter is 1023 if 10 BITs are provided, the value is overflowed and reversed and the counting is carried out from 0 if the maximum value is exceeded.

Currently, a usually adopted method of preventing the counting overflow of a counter of a network chip is: a drive periodically polls counting values of a counter by virtue of a timer and constantly collects sample values of the counting values, and if a sample value reaches a threshold, an upper-layer drive records the sampling value, and resets the counter to count starting from 0.

However, the defects of the counting way are that a processor needs to constantly sample the counter which causes great computational burden on the processor.

SUMMARY

In view of the above, the embodiments of the present disclosure provide a method for implementing counting control of a counter, and a network chip, so as to prevent a processor from constantly sampling the counter to check the state of the counter, and ensure the calculation performance of the processor.

According to one aspect of the embodiments of the present disclosure, a method for implementing counting control of a counter is provided and the method is applicable to a network chip with a processor and a counter. The method includes: A, periodically generating a counting value scanning message; B, reading a counting value of a corresponding counter item according to the generated counting value scanning message; C, analyzing and judging whether the read counting value is less than a preset overflow threshold; D, informing the processor to handle counting abnormality of the counter when the read counting value is not less than the preset overflow threshold.

In an example embodiment, the method further includes: discarding the counting value scanning message when the read counting value is less than the preset overflow threshold.

In an example embodiment, contents of the counting value scanning message include a counter item index, and the counter item index is carried in the periodically generated counter scanning message.

In an example embodiment, periodically generating the counting value scanning message includes: configuring a generating period of the counting value scanning message and contents of the counting value scanning message; periodically generating the counting value scanning message according to the configured generating period of the counting value scanning message and configured contents of the counting value scanning message.

In an example embodiment, informing the processor to handle the counting abnormality of the counter includes: sending an interrupt request to the processor, and reporting the counting value scanning message to the processor to inform a state of the counter; in response to the interrupt request, reading and recording, by the processor, the counting value of the corresponding counter item according to the reported counting value scanning message, and resetting the counter at the same time.

A network chip applying the method for implementing the counting control of the counter in the network chip is also provided. The network chip includes a packet generator and a message processing engine, wherein the packet generator is configured to periodically generate a counting value scanning message; and the message processing engine is configured to read a counting value of a corresponding counter item according to the generated counting value scanning message, analyze and judge whether the read counting value is less than a preset overflow threshold, and inform the processor to handle counting abnormality of the processor when the read counting value is not less than the preset overflow threshold.

In an example embodiment, the message processing engine is further configured to discard the counting value scanning message when the read counting value is less than the preset overflow threshold.

In an example embodiment, the packet generator is configured to periodically generate the counting value scanning message according to a configured generating period of the counting value scanning message and configured contents of the counting value scanning message.

In an example embodiment, the message processing engine is configured to inform the processor to handle counting abnormality of the counter through a following manner: sending an interrupt request to the processor, and reporting the counting value scanning message to the processor to inform a state of the counter.

Compared with the related art, periodic diagnosis on a counting state of the counter in the network chip can be realized by the embodiments of the present disclosure through using the packet generator and the message processing engine, so as to prevent the processor from constantly sampling the counter to check the state of the counter, and ensure the calculation performance of the processor.

The realization of the aims, as well as the function characteristics and advantages of the present disclosure will be further specified by combining the embodiments, by reference to the drawings.

DETAILED DESCRIPTION OF THE EMBODIMENTS

The embodiments described should be understood to be used for explaining the present disclosure, but not be used for limiting the present disclosure.

Figure 1:
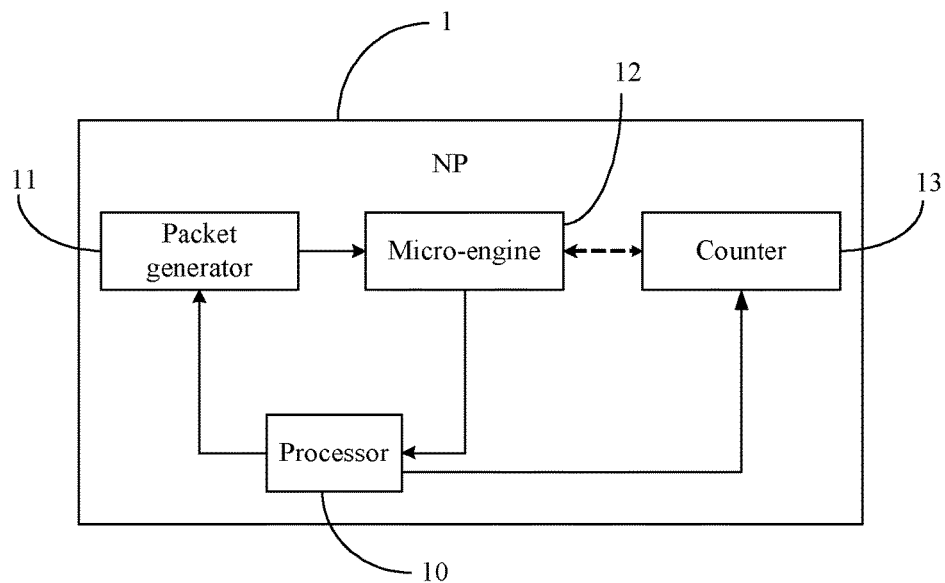
FIG. 1 is a diagram showing the system architecture of a network chip according to an example embodiment of the present disclosure.

FIG. 1 is a diagram showing the system architecture of a network chip according to an example embodiment of the present disclosure. A network chip 1 is configured to process network communication data, and may be an NP or any other applicable network communication data processing chip.

The network chip 1 includes a processor 10, a packet generator 11, a message processing engine 12 and a counter 13.

The counter 13 may be an inner memory or an outer memory (such as a static random access memory) including counting bits of n bits wide, and the counting value can be overflowed and reversed when the counting value reaches 2n−1.

The processor 10 is configured to configure the packet generator 11, so as to configure a generating period of the counting value scanning message and contents of the counting value scanning message. In the embodiment, contents of the counting value scanning message include a counter item index Idx, and the value of Idx is periodically increased, for example, the value of Idx may be 1, 2, 3 . . . , N, 1, 2, 3, . . . .

Figure 2:
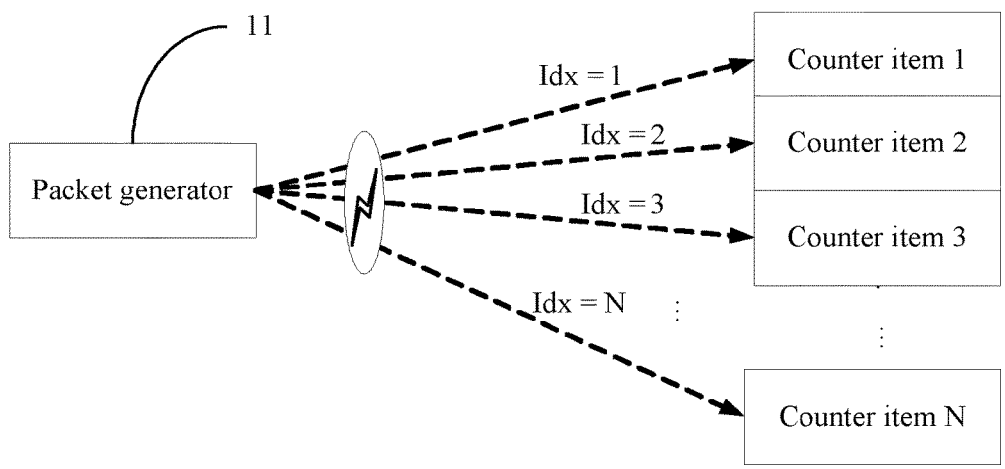
FIG. 2 and FIG. 3 are schematic diagrams showing the periodic generation of the counting value scanning message by the packet generator 11 in FIG. 1.
Figure 3:
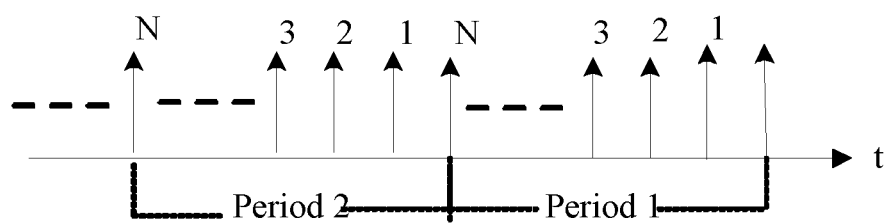

FIG. 2 and FIG. 3 show that the counter 13 has N counter items, namely, counter item 1, 2, 3, . . . , N. The processor 10 configures the packet generator 11 so that the packet generator 11 is able to periodically generate the counting value scanning message, wherein a counter item index (Idx=1, 2, 3, . . . , N) is carried in the counting value scanning message. After the value of Idx reaches N, the value of Idx turns to 1 and is likewise periodically increased. Assuming that the generating period of the counting value scanning message configured by the processor 10 is T, then the scanning period of each counter item is NT, i.e. the message processing engine 12 scans the counter value of the same counter item at an interval of NT to judge whether the counter value is going to be overflowed.

The packet generator 11 is configured to periodically generate the counting value scanning message according to the configured generating period of the counting value scanning message and the configured contents of the counting value scanning message. In the embodiment, the counter item index Idx is carried in the generated counting value scanning message.

The message processing engine 12 is a programmable packet processor in which a command code is provided. For example, when the network chip 1 is the NP, the message processing engine 12 may be a micro-engine in the NP. In the embodiment, the message processing engine 12 controls the processing of the counting value scanning message, and the processing procedure is: the counter item index Idx is acquired from the counting value scanning message generated by the packet generator 11; the counting value of the counter item corresponding to the acquired counter item index Idx is read; the read counting value is compared with a preset overflow threshold; if the read counting value is less than the preset overflow threshold, the message is discarded, or if the read counting value is not less than the preset overflow threshold, an interrupt request is sent to the processor 10, and the counting value scanning message is reported to the processor 10 to inform the processor 10 of a state (overflow state) of the counter.

The processor 10 is further configured to process the interrupt request sent by the message processing engine 12, acquire the counter index Idx in the reported counting value scanning message, read and record the counting value of the counter item corresponding to the acquired counter item index Idx, and reset the counter 13 at the same time.

Figure 4:
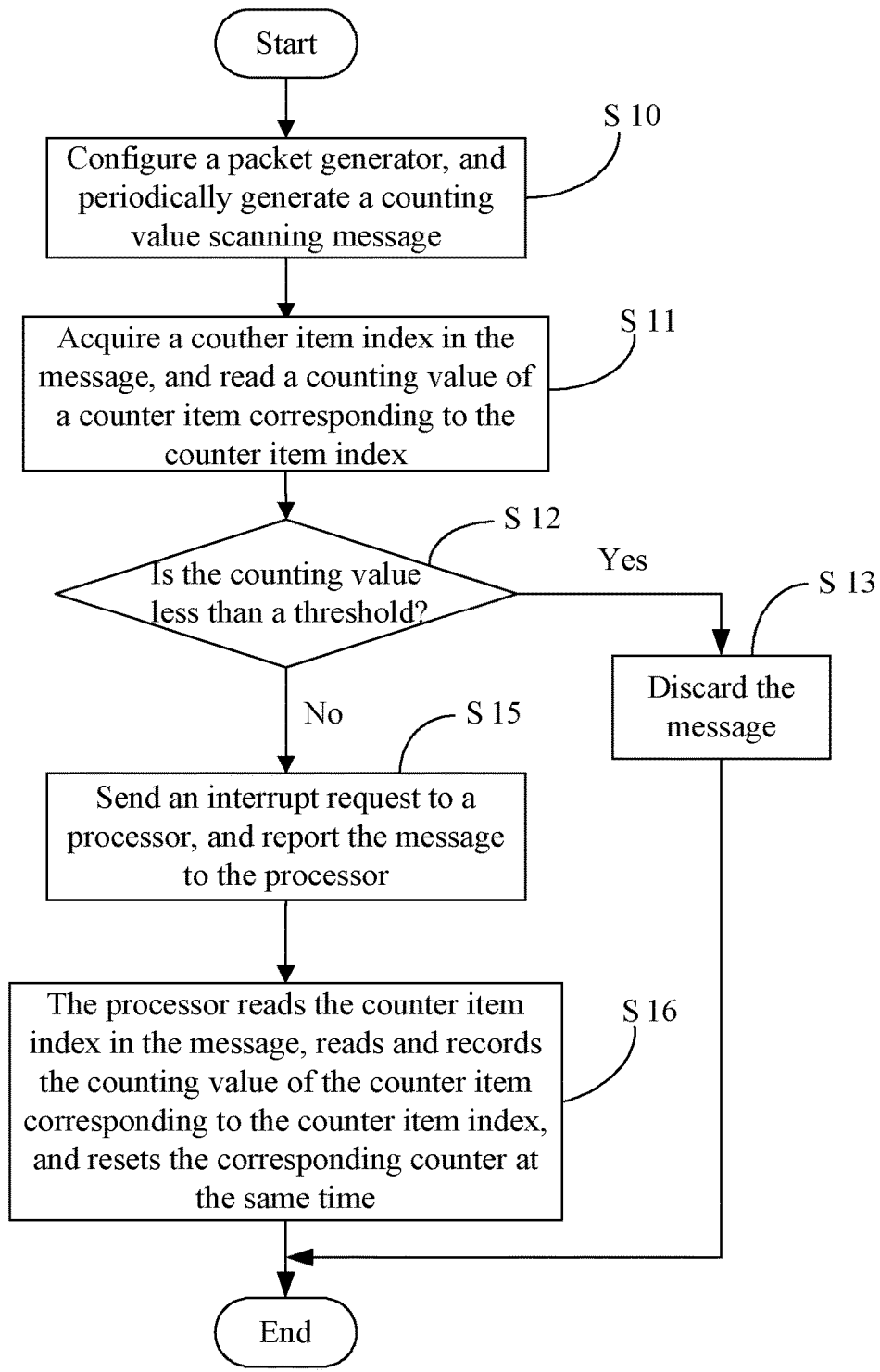
FIG. 4 is a specific implementation flow chart of the method for implementing counting control of a counter in a network chip according to an example embodiment of the present disclosure.

FIG. 4 is a specific implementation flow chart of the method for implementing counting control of a counter in a network chip according to an example embodiment of the present disclosure.

It is important to note that the flow chart shown in FIG. 4 is merely an example embodiment. Those skilled in the art should know that any embodiment based on the idea of the present disclosure should not be separated from the scope covered by the technical scheme.

A counting value scanning message is periodically generated; a counting value of a corresponding counter item is read according to the generated counting value scanning message; whether the read counting value is less than a preset overflow threshold is analyzed and judged; when the read counting value is not less than the preset overflow thread value, the processor 10 is made to read and record the counting value of the corresponding counter item according to the reported counting value scanning message, and the counter 13 is reset at the same time.

It should be noted that, as one embodiment of the disclosure, the technical scheme may further include the following step: the counting value scanning message is discarded when the read counting value is less than the preset overflow threshold. As another embodiment of the present disclosure, the processing manner of discarding the counting value scanning message may be replaced by other processing ways.

The counting control on the counter 13 in the network chip 1 may be implemented by the following steps in this embodiment.

Step S10, the processor 10 configures a generating period of the counting value scanning message and contents of the counting value scanning message to the packet generator 11; the packet generator 11 generates the counting value scanning message periodically according to the configured generating period of the counting value scanning message and the configured contents of the counting value scanning message. In the embodiment, the contents of the counting value scanning message include a counter item index, and the value of Idx is periodically increased, for example, the value of Idx may be periodically increased from 1, 2, 3, . . . , N, 1, 2, 3, . . . . The counter item index Idx is carried in the generated counting value scanning message.

Step S11, the message processing engine 12 acquires the counter item index Idx from the counting value scanning message generated by the packet generator 11, and reads the counting value of the counter item corresponding to the acquired counter item index Idx.

Step S12, the message processing engine 12 analyzes and judges whether the read counting value is less than a preset overflow threshold.

If the counting value is less than the preset overflow threshold, the following step S13 is executed; or, if the counting value is not less than the preset overflow threshold, steps S15 and S16 are executed.

Step S13, the message is discarded.

Step S15, the message processing engine 12 transmits an interrupt request to the processor 10, and reports the counting value scanning message to the processor 10 to inform the processor 10 of a state (i.e. the overflow state) of the counter.

Step S16, the processor 10 processes the interrupt request sent by the message processing engine 12, acquires the counter index Idx from the reported counting value scanning message, reads and records the counting value of the counter item corresponding to the acquired counter item index Idx, and resets the counter 13 at the same time.

The above contents are the example embodiments of the present disclosure only, but are not used to limit the patent scope of the present disclosure. All equivalent structures or equivalent flows, which are converted by using the contents of the specifications and the drawings, or are directly or indirectly applied to other relevant technical fields, are included in the patent protection scope of the present disclosure.

INDUSTRIAL APPLICABILITY

The technical scheme provided by the embodiments of the present disclosure can applied to the field of a network chip controlling technologies, so as to prevent a processor from constantly sampling a counter to determine the state of the counter, and ensure the calculation performance of the counter. The embodiments of the present disclosure further provide a network chip applying the above method for implementing counting control of a counter in a network chip.

What is claimed is:

1. A method for implementing counting control of a counter in a network chip, which is applicable to the network chip with a processor and the counter, comprising:
    periodically generating a counting value scanning message;
    reading a counting value of a corresponding counter item according to the generated counting value scanning message;
    analyzing and judging whether the read counting value is less than a preset overflow threshold;
    informing the processor to handle counting abnormality of the counter when the read counting value is not less than the preset overflow threshold.

2. The method for implementing the counting control of the counter in the network chip as claimed in claim 1, further comprising:
    discarding the counting value scanning message when the read counting value is less than the preset overflow threshold.

3. The method for implementing the counting control of the counter in the network chip as claimed in claim 1, wherein contents of the counting value scanning message comprise a counter item index, and the counter item index is carried in the periodically generated counting value scanning message.

4. The method for implementing the counting control of the counter in the network chip as claimed in claim 1, wherein periodically generating the counting value scanning message comprises:
    configuring a generating period of the counting value scanning message and contents of the counting value scanning message;
    periodically generating the counting value scanning message according to the configured generating period of the counting value scanning message and the configured contents of the counting value scanning message.

5. The method for implementing the counting control of the counter in the network chip as claimed in claim 1, wherein informing the processor to handle the counting abnormality of the counter comprises:
    sending an interrupt request to the processor, and reporting the counting value scanning message to the processor to inform a state of the counter;
    in response to the interrupt request, reading and recording, by the processor, the counting value of the corresponding counter item according to the reported counting value scanning message, and resetting the counter at the same time.

6. The method for implementing the counting control of the counter in the network chip as claimed in claim 2, wherein periodically generating the counting value scanning message comprises:
    configuring a generating period of the counting value scanning message and contents of the counting value scanning message;
    periodically generating the counting value scanning message according to the configured generating period of the counting value scanning message and the configured contents of the counting value scanning message.

7. The method for implementing the counting control of the counter in the network chip as claimed in claim 3, wherein periodically generating the counting value scanning message comprises:
    configuring a generating period of the counting value scanning message and contents of the counting value scanning message;
    periodically generating the counting value scanning message according to the configured generating period of the counting value scanning message and the configured contents of the counting value scanning message.

8. The method for implementing the counting control of the counter in the network chip as claimed in claim 2, wherein informing the processor to handle the counting abnormality of the counter comprises:
    sending an interrupt request to the processor, and reporting the counting value scanning message to the processor to inform a state of the counter;
    in response to the interrupt request, reading and recording, by the processor, the counting value of the corresponding counter item according to the reported counting value scanning message, and resetting the counter at the same time.

9. The method for implementing the counting control of the counter in the network chip as claimed in claim 3, wherein informing the processor to handle the counting abnormality of the counter comprises:
    sending an interrupt request to the processor, and reporting the counting value scanning message to the processor to inform a state of the counter;
    in response to the interrupt request, reading and recording, by the processor, the counting value of the corresponding counter item according to the reported counting value scanning message, and resetting the counter at the same time.

10. The method for implementing the counting control of the counter in the network chip as claimed in claim 3, wherein a value of the counter item index is periodically increased, and a scanning period of each counter item is NT, wherein N is the number of counter items in the counter, and T is a generating period of the counting value scanning message.

11. A network chip applying the method as claimed in claim 1, wherein the network chip comprises:
   a packet generator, which is configured to periodically generate a counting value scanning message; and
   a message processing engine, which is configured to read a counting value of a corresponding counter item according to the generated counting value scanning message, analyze and judge whether the read counting value is less than a preset overflow threshold, and inform the processor to handle counting abnormality of the counter when the read counting value is not less than the preset overflow threshold.

12. The network chip as claimed in claim 11, wherein the message processing engine is further configured to discard the counting value scanning message when the read counting value is less than the preset overflow threshold.

13. The network chip as claimed in claim 12, wherein the packet generator is configured to periodically generate the counting value scanning message according to a configured generating period of the counting value scanning message and configured contents of the counting value scanning message.

14. The network chip as claimed in claim 12, wherein the message processing engine is configured to inform the processor to handle the counting abnormality of the counter through a following manner:
   sending an interrupt request to the processor, and reporting the counting value scanning message to the processor to inform a state of the counter.

15. The network chip as claimed in claim 11, wherein the packet generator is configured to periodically generate the counting value scanning message according to a configured generating period of the counting value scanning message and configured contents of the counting value scanning message.

16. The network chip as claimed in claim 11, wherein the message processing engine is configured to inform the processor to handle the counting abnormality of the counter through a following manner:
   sending an interrupt request to the processor, and reporting the counting value scanning message to the processor to inform a state of the counter.

17. A network chip applying the method as claimed in claim 2, wherein the network chip comprises:
   a packet generator, which is configured to periodically generate a counting value scanning message; and
   a message processing engine, which is configured to read a counting value of a corresponding counter item according to the generated counting value scanning message, analyze and judge whether the read counting value is less than a preset overflow threshold, and inform the processor to handle counting abnormality of the counter when the read counting value is not less than the preset overflow threshold.

18. A network chip applying the method as claimed in claim 3, wherein the network chip comprises:
   a packet generator, which is configured to periodically generate a counting value scanning message; and
   a message processing engine, which is configured to read a counting value of a corresponding counter item according to the generated counting value scanning message, analyze and judge whether the read counting value is less than a preset overflow threshold, and inform the processor to handle counting abnormality of the counter when the read counting value is not less than the preset overflow threshold.

19. A network chip applying the method as claimed in claim 4, wherein the network chip comprises:
   a packet generator, which is configured to periodically generate a counting value scanning message; and
   a message processing engine, which is configured to read a counting value of a corresponding counter item according to the generated counting value scanning message, analyze and judge whether the read counting value is less than a preset overflow threshold, and inform the processor to handle counting abnormality of the counter when the read counting value is not less than the preset overflow threshold.

20. A network chip applying the method as claimed in claim 5, wherein the network chip comprises:
   a packet generator, which is configured to periodically generate a counting value scanning message; and
   a message processing engine, which is configured to read a counting value of a corresponding counter item according to the generated counting value scanning message, analyze and judge whether the read counting value is less than a preset overflow threshold, and inform the processor to handle counting abnormality of the counter when the read counting value is not less than the preset overflow threshold.

\* \* \* \* \*